(12) United States Patent
Asati et al.

(10) Patent No.: US 8,503,453 B2
(45) Date of Patent: Aug. 6, 2013

(54) ADAPTIVE QUALITY OF SERVICE IN AN EASY VIRTUAL PRIVATE NETWORK ENVIRONMENT

(75) Inventors: Rajiv Asati, Morrisville, NC (US); Mohamed Khalid, Cary, NC (US); Aamer Akhter, Cary, NC (US); Pratima Sethi, Mumbai (IN)

(73) Assignee: Cisco Technology, Inc., San Jose, CA (US)

( * ) Notice: Subject to any disclaimer, the term of this patent is extended or adjusted under 35 U.S.C. 154(b) by 712 days.

(21) Appl. No.: 11/601,948

(22) Filed: Nov. 20, 2006

(65) Prior Publication Data

US 2008/0117821 A1 May 22, 2008

(51) Int. Cl.
*H04L 12/26* (2006.01)

(52) U.S. Cl.
USPC ............. 370/395.21; 370/233; 370/234

(58) Field of Classification Search
USPC .................. 370/395.21, 233, 234
See application file for complete search history.

(56) References Cited

U.S. PATENT DOCUMENTS

| | | | | |
|---|---|---|---|---|
| 5,822,317 A * | 10/1998 | Shibata | ............ | 370/395.62 |
| 6,374,288 B1 * | 4/2002 | Bhagavath et al. | ...... | 709/203 |
| 6,445,679 B1 * | 9/2002 | Taniguchi et al. | ...... | 370/232 |
| 6,707,820 B1 * | 3/2004 | Arndt et al. | ............ | 370/395.2 |
| 6,862,622 B2 * | 3/2005 | Jorgensen | ............ | 709/226 |
| 6,965,563 B1 * | 11/2005 | Hospodor et al. | ...... | 370/231 |
| 7,136,382 B1 * | 11/2006 | Sharma et al. | ............ | 370/392 |
| 2001/0015978 A1 * | 8/2001 | Blanset et al. | ............ | 370/395 |
| 2002/0073197 A1 * | 6/2002 | Bhogal et al. | ............ | 709/224 |
| 2002/0078341 A1 * | 6/2002 | Genty et al. | ............ | 713/151 |
| 2002/0091802 A1 * | 7/2002 | Paul et al. | ............ | 709/220 |
| 2002/0194345 A1 * | 12/2002 | Lu et al. | ............ | 709/227 |
| 2004/0006602 A1 * | 1/2004 | Bess et al. | ............ | 709/207 |
| 2004/0081167 A1 * | 4/2004 | Hassan-Ali et al. | ..... | 370/395.42 |
| 2004/0220966 A1 * | 11/2004 | Ridge | ............ | 707/104.1 |
| 2005/0088977 A1 * | 4/2005 | Roch et al. | ............ | 370/254 |
| 2005/0198262 A1 * | 9/2005 | Barry et al. | ............ | 709/224 |
| 2006/0023663 A1 * | 2/2006 | Kim et al. | ............ | 370/329 |
| 2006/0031374 A1 * | 2/2006 | Lu et al. | ............ | 709/207 |
| 2006/0101515 A1 * | 5/2006 | Amoroso et al. | ............ | 726/23 |
| 2006/0219776 A1 * | 10/2006 | Finn | ............ | 235/380 |
| 2007/0050492 A1 * | 3/2007 | Jorgensen | ............ | 709/223 |
| 2007/0171909 A1 * | 7/2007 | Pignatelli | ............ | 370/392 |
| 2007/0280105 A1 * | 12/2007 | Barkay et al. | ............ | 370/229 |
| 2010/0005288 A1 * | 1/2010 | Rao et al. | ............ | 713/151 |

OTHER PUBLICATIONS

Bollapragada et al.; IPSec VPN Design, Mar. 29, 2005; relavant sections included as PDF.*

* cited by examiner

*Primary Examiner* — Jay P Patel
(74) *Attorney, Agent, or Firm* — Hickman Palermo Truong Becker Bingham Wong LLP

(57) ABSTRACT

In one embodiment, a QoS manager process that receives, at an EzVPN server device, connection speed data from an EzVPN client device. In addition, the QoS manager process processes, at the EzVPN server device, the connection speed data to determine a QoS policy for a communications session between the EzVPN client device and the EzVPN server device. Furthermore, the QoS manager process applies, at the EzVPN server device, the QoS policy to the communications session between the EzVPN client device and the EzVPN server device as determined by the processing of the connection speed data.

28 Claims, 5 Drawing Sheets

ADAPTIVE QUALITY OF SERVICE IN AN EASY VIRTUAL PRIVATE NETWORK ENVIRONMENT

TECHNICAL FIELD

The present disclosure relates generally to the implementation and administration of Quality of Service policies in an Easy Virtual Private Network environment.

BACKGROUND

In some networks, the packaged data is classified into different Quality of Service (QoS) classes that dictate how competing traffic flows are provided resources. Such resource allocation affects how quickly the packaged data travels from a source to a destination. For example, a distinction may be drawn between packets carrying video data (i.e., video packets belonging to a video QoS class) and packets carrying general data (i.e., general data packets belonging to a general data QoS class such as Best Effort Service). In this arrangement, a data communications device routes video packets through a network differently than general data packets due to different link resource availability and resources being allocated differently based on the QoS class of the packets.

There are different types of QoS routing techniques. In one QoS routing technique (hereinafter called QoS class-prioritized routing), a data communications device internally prioritizes the processing of different QoS class packets in accordance with a pre-established QoS policy. For example, in accordance with one such QoS policy, a data communications device gives higher priority to video packets relative to general data packets. Accordingly, if the data communications device simultaneously receives a video packet and a general data packet (e.g., through multiple input ports), the QoS policy directs the device to process the video packet before the general data packet. As a result, in QoS class-prioritized routing, packet destinations (i.e., receiving host computers) generally perceive different responses, or Qualities of Service, for different QoS classes (e.g., faster video transmissions than general data transmissions).

BRIEF DESCRIPTION OF THE DRAWINGS

The foregoing will be apparent from the following more particular description of embodiments of Adaptive QoS in an Easy Virtual Private Network (EzVPN), as illustrated in the accompanying drawings and figures in which like reference characters refer to the same parts throughout the different views. The drawings are not necessarily to scale, with emphasis instead being placed upon illustrating the embodiments, principles and concepts of the Adaptive QoS in an EzVPN.

DESCRIPTION OF EXAMPLE EMBODIMENTS

Overview

Generally, embodiments disclosed herein provide a QoS manager process that receives, at an EzVPN server device, connection speed data from an EzVPN client device. In addition, the QoS manager process processes, at the EzVPN server device, the connection speed data to determine a QoS policy for a communications session between the EzVPN client device and the EzVPN server device. Furthermore, the QoS manager process applies, at the EzVPN server device, the QoS policy to the communications session between the EzVPN client device and the EzVPN server device as determined by the processing of the connection speed data.

In another example embodiment disclosed herein, the QoS manager process obtains, at the EzVPN client device, connection speed data from a network communications device associated with the EzVPN client device. Moreover, the QoS manager process transmits, from the EzVPN client device, the connection speed data to the EzVPN server device. At the EzVPN server device, the QoS manager process receives the connection speed data from the EzVPN client device. Additionally at the EzVPN server device, the QoS manager process processes the connection speed data to determine a QoS policy for the communications session between the EzVPN client device and the EzVPN server device. Furthermore, the QoS manager process applies, at the EzVPN server device, a QoS policy to the communications session between the EzVPN client device and the EzVPN server device as determined by the processing of the connection speed data.

Generally, embodiments disclosed herein describe a QoS manager process that determines an appropriate QoS policy for a given connection speed associated with a communications session between an EzVPN client and an EzVPN server. In accordance with an example embodiment, upon determining the appropriate QoS policy, the QoS manager process dynamically configures the QoS policy to the communications session between the EzVPN client and EzVPN serve. By configuring an appropriate QoS policy that is scaled to a given connection speed, the QoS manager process provides for the efficient transfer of data (both upload and download) between the EzVPN client and EzVPN server, and mitigates data loss due to incompatible bandwidth capacities allotted for each device. In example embodiments disclosed herein, the QoS manager process may obtain the QoS policy locally at the EzVPN server and/or from a remote source.

Figure 1:
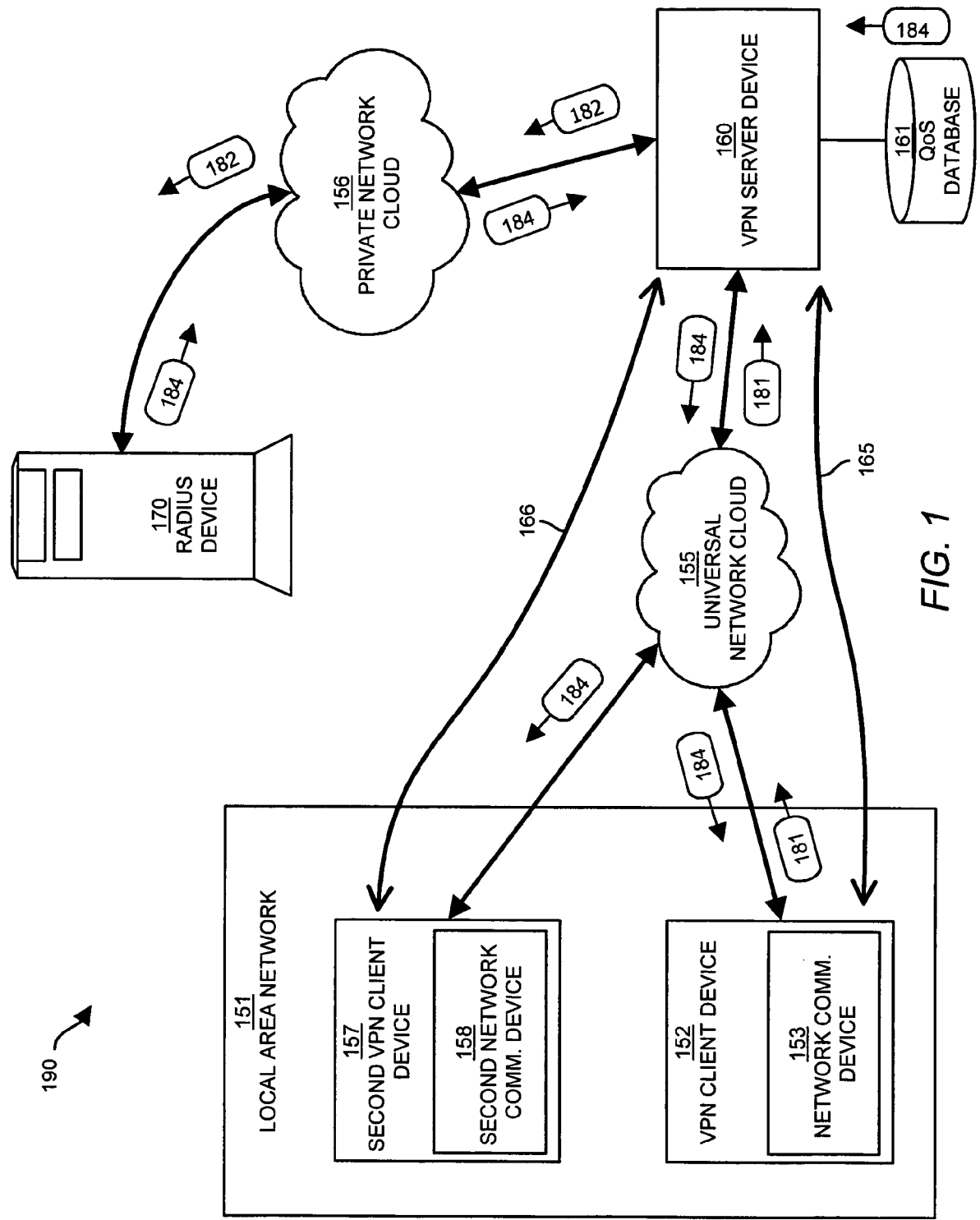
FIG. 1 is a block diagram that illustrates an embodiment of the QoS manager process when it implements adaptive QoS in an EzVPN environment in accordance with one example configuration.

FIG. 1 depicts an example embodiment of an EzVPN environment 190 comprising a communications session 165 between an EzVPN client device 152 (e.g., personal computer, laptop, workstation, etc.) and an EzVPN server device 160 (e.g., provider edge router). The communications session 165 involves the transfer of data between the EzVPN client device 152 and the EzVPN server device 160. The EzVPN client device 152 communicates with the EzVPN server device 160 via an associated network communications device 153 (e.g, Digital Subscriber Line "DSL" modem, cable modem, etc.). Typically, as shown in the example embodiment of FIG. 1, the EzVPN client device 152 is associated with the network communications device 153 as part of a Local Area Network 151 (LAN). The LAN 151 shown in FIG. 1 also includes a second EzVPN client device 157 that communicates with the EzVPN server device 160 via a second network communications device 158. Similarly, the EzVPN environment 190 comprises a second communications session 166 between the second EzVPN client device 157 and the EzVPN server device 160. The EzVPN client device 152 and second EzVPN client device 157 communicate (via network communications device 153 and second network communications device 158, respectively) with the EzVPN server device 160 across a universal network cloud 155 that contains typical internetworking devices and components (e.g., routers, gateways, etc.) suitable for propagating data across a large network such as the Internet. Moreover, the universal network cloud 155 depicted in FIG. 1 represents a secure connection between the EzVPN client device 152 and the EzVPN server device 160 by applying conventional EzVPN techniques commonly known in the art (wherein EzVPN also refers to Internet Protocol Security "IPSec" VPN's).

Still referring to the example embodiment shown in FIG. 1, the EzVPN server device 160 includes a local QoS database 161 that contains, inter alia, information regarding QoS policy mapping and the administration of those QoS policies. The EzVPN server device 160 also communicates with a Remote Authentication Dial In User Service (RADIUS) device 170 via private network cloud 156. In its operation, the RADIUS device 170 implements an Authentication, Authorization and Accounting (AAA) protocol for purposes of network access and network mobility as generally known in the art. As depicted in the example embodiment of FIG. 1, the EzVPN server device 160 and RADIUS device 170 exchange information regarding the maintenance and administration of network QoS policies. The private network cloud 156 consists of various internetworking components and equipment (e.g., routers) suitable for securely propagating data through a private network.

Figure 2:
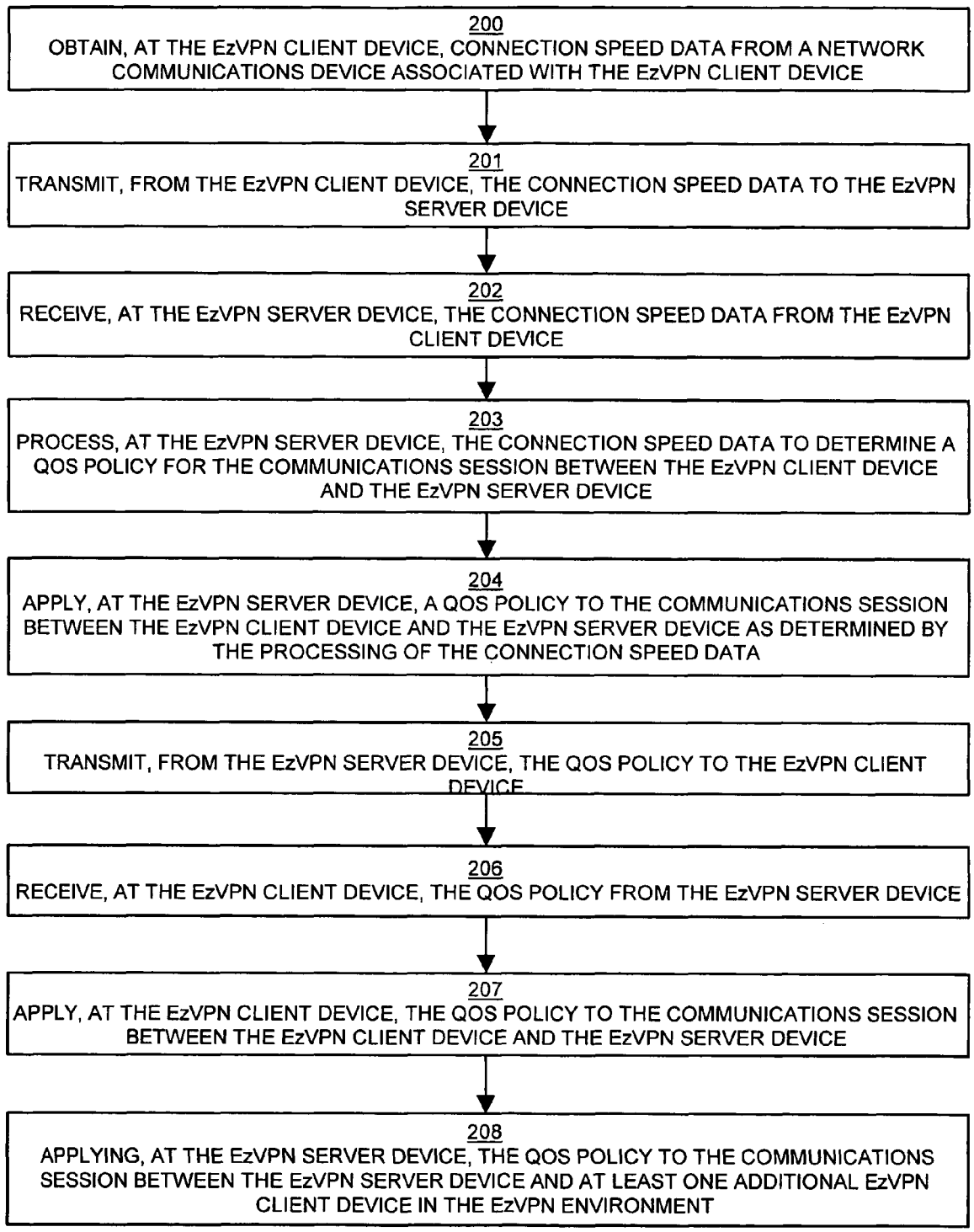
FIG. 2 is a flow chart of processing steps that shows high-level processing operations performed by the QoS manager process 150-2 when it implements adaptive QoS in an EzVPN environment in accordance with one example configuration.
Figure 3:
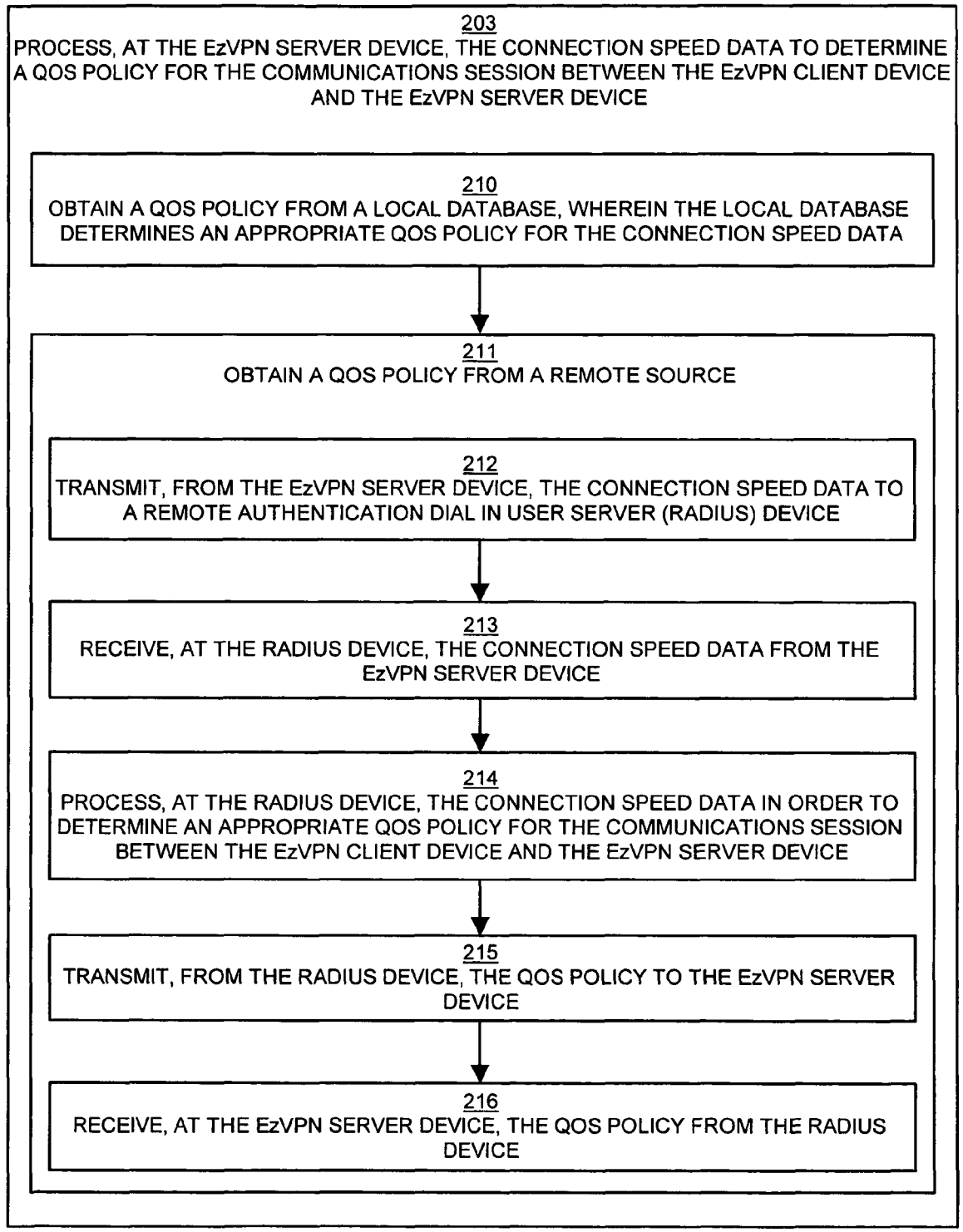
FIG. 3 is a flow chart of processing steps that shows high-level processing operations performed by the QoS manager process 150-2 when it processes connection speed data to determine a QoS policy in accordance with one example configuration.
Figure 4:
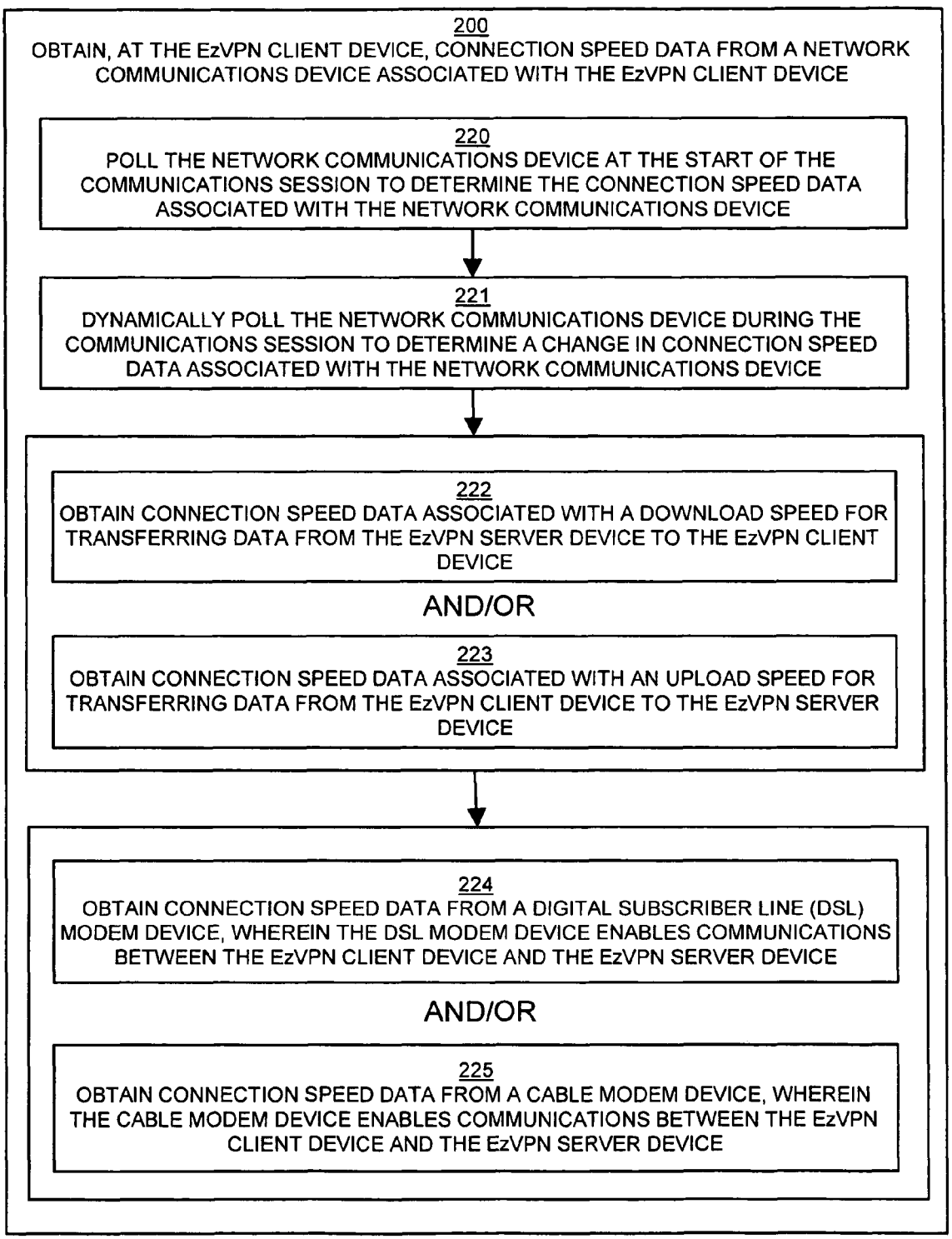
FIG. 4 is a flow chart of processing steps that shows high-level processing operations performed by the QoS manager process 150-2 when it obtains connection speed data from the network communications device in accordance with one example configuration.

Flow charts of the presently disclosed methods are depicted in FIGS. 2 through 4. The rectangular elements are herein denoted "steps" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

FIG. 2 is a flow chart of processing steps that shows high-level processing operations performed by the QoS manager process 150-2 when it implements adaptive QoS in an EzVPN environment in accordance with one example configuration.

In step 200, the QoS manager process 150-2 obtains, at the EzVPN client device 152, connection speed data from the network communications device 153 (e.g., DSL modem, cable modem, etc.) associated with the EzVPN client device 152. For example, in one embodiment the connection speed data represents the transfer speed (e.g., upload rate) for data from the EzVPN client device 152 to the EzVPN server device 160 that the network communications device 153 allocates for the EzVPN client device 152 during the communications session 165. In an alternate embodiment, the connection speed data represents the receive speed (e.g., download or downstream bandwidth) for data transferred from the EzVPN server device 160 to the EzVPN client device 152 as allocated by the network communications device 153. In yet another embodiment the connection speed data contains both the transfer speed (e.g., upload or upstream bandwidth) and the receive speed (e.g., download rate).

In step 201, the QoS manager process 150-2 transmits, from the EzVPN client device 152, the connection speed data to the EzVPN server device 160. In the example embodiment of FIG. 1, the EzVPN client device 152 transmits the connection speed data (e.g., transfer and/or receive speeds) to the EzVPN server device 160 across the universal network cloud 155 via network communications device 153. Furthermore, in referencing the example embodiment of FIG. 1, the EzVPN client device 152 transmits the connection speed data using a Q0S_UPDATE message as part of a NOTIFY_PAYLOAD data packet 181. Typically, the EzVPN client device 152 initiates the Internet Key Exchange (IKE)/IPSec connection with the EzVPN server device 160 in order to convey the connection speed data to the EzVPN server device 160. For example, in one embodiment the NOTIFY_PAYLOAD data packet 181 is an Internet Security Association and Key Management Protocol (ISAKMP) notification payload message.

In step 202, the QoS manager process 150-2 receives, at the EzVPN server device 160, the connection speed data from the EzVPN client device 152. In the example embodiment of FIG. 1, the EzVPN server device 160 receives the connection speed data from across the universal network cloud 155 in the form of a QOS_UPDATE message as part of the NOTIFY_PAYLOAD data packet 181 (e.g., the EzVPN server device 160 receives an ISAKMP notification payload message).

In step 203, the QoS manager process 150-2 processes, at the EzVPN server device 160, the connection speed data to determine a QoS policy 184 for the communications session 165 between the EzVPN client device 152 and the EzVPN server device 160. Details of the QoS manager process 150-2 processing of the connection speed data are described in more detail below.

In one example embodiment, the QoS manager process 150-2 processes the connection speed data in order determine an appropriate QoS policy comprising at least one of: a shaping parameter based on the connection speed data, a queuing parameter based on the connection speed data, a policing parameter based on the connection speed data, and/or a bandwidth parameter based on the connection speed data. It should be noted that the QoS policy 184 may comprise other similar parameters suitable for administering a QoS policy in an EzVPN environment.

In an alternate embodiment, the QoS manager process 150-2 obtains, at the EzVPN server device 160, a pre-defined default QoS policy if the connection speed data does not map to a QoS policy during the processing of the connection speed data. The EzVPN server device 160, therefore, will use the pre-defined default QoS policy, notwithstanding the connection speed data, since the parameters of the connection speed data could not map to a compatible QoS policy.

In step 204, the QoS manager process 150-2 applies, at the EzVPN server device 160, a QoS policy 184 to the communications session 165 between the EzVPN client device 152 and the EzVPN server device 160 as determined by the processing of the connection speed data. As a result, the transfer of data during the communications session 165 between the EzVPN client device 152 and EzVPN server device 160 is subject to the rules and procedures of the new QoS policy 184.

In step 205, the QoS manager process 150-2 transmits, from the EzVPN server device 160, the QoS policy 184 to the EzVPN client device 152. In accordance with the example embodiment of FIG. 1, the EzVPN server device 160 transmits the QoS policy 184 to the EzVPN client device 152 across the universal network cloud 155.

In step 206, the QoS manager process 150-2 receives, at the EzVPN client device 152, the QoS policy 184 from the EzVPN server device 160.

In step 207, the QoS manager process 150-2 applies, at the EzVPN client device 152, the QoS policy 184 to the communications session 165 between the EzVPN client device 152 and the EzVPN server device 160. By obtaining the QoS policy 184 from the EzVPN server device 160, the EzVPN client device 152 is capable of applying the QoS policy parameters (e.g., policing, shaping, etc.) to the outgoing traffic (per-class) toward the EzVPN server device 160.

In step 208, the QoS manager process 150-2 applies, at the EzVPN server device 160, the QoS policy 184 to the communications session 166 between the EzVPN server device 160 and at least one additional EzVPN client device (e.g., the second EzVPN client device 157) in the EzVPN environment 190. More specifically, the EzVPN server device 160 applies the QoS policy 184 as determined by the connection speed data received from the EzVPN client device 152 on a per-class basis. Consequently, the additional EzVPN client devices (e.g., the second EzVPN client device 157 in LAN 151) are subject to the same QoS policy.

FIG. 3 is a flow chart of the processing steps for a particular embodiment of the high-level processing operations performed by the QoS manager process 150-2 when it processes connection speed data to determine a QoS policy in accordance with one example configuration.

In step 210, the QoS manager process 150-2 obtains the QoS policy 184 from a local QoS database, wherein the local database determines an appropriate QoS policy for the connection speed data. In the example embodiment of FIG. 1, the EzVPN server device 160 queries the local QoS database 161 using the connection speed data in order to retrieve the QoS policy 184. The QoS database 161, in turn, maps the connection speed data to a set of pre-defined QoS policy ranges in order to procure a QoS policy commensurate with the parameters contained in the connection speed data.

In step 211, the QoS manager process 150-2 obtains the QoS policy 184 from a remote source. For example, in one embodiment the remote source may be a separate server that has a QoS database. Details of the QoS manager process 150-2 obtaining the QoS policy 184 from a remote source are discussed in more detail below.

In step 212, the QoS manager process 150-2 transmits, from the EzVPN server device 160, the connection speed data to RADIUS device 170. As per the example embodiment shown in FIG. 1, the EzVPN server device 160 transmits the connection speed data using a CONNECT_INFO data packet 182 (e.g., in accordance with RADIUS attribute 77) to the RADIUS device 170 across the private network cloud 156.

In step 213, the QoS manager process 150-2 receives, at the RADIUS device 170, the connection speed data from the EzVPN server device 160. Similarly, the RADIUS device 170 in FIG. 1 receives the CONNECT_INFO data packet 182 (e.g., in accordance with RADIUS attribute 77) containing the connection speed data from the EzVPN server device 160.

In step 214, the QoS manager process 150-2 processes, at the RADIUS device 170, the connection speed data in order to determine an appropriate QoS policy 184 for the communications session 165 between the EzVPN client device 152 and the EzVPN server device 160. More specifically, the RADIUS device 170 policy engine implements the requisite mapping between the Policy Map and the Subscriber QoS AV Pair update as is generally known in the art.

In step 215, the QoS manager process 150-2 transmits, from the RADIUS device 170, the QoS policy 184 to the EzVPN server device 160. In the example embodiment shown in FIG. 1, the RADIUS device 170 pushes the QoS policy 184 to the EzVPN server device 160 using Vendor Specific Attribute (VSA) 38 as is commonly known in the art.

In step 216, the QoS manager process 150-2 receives, at the EzVPN server device 160, the QoS policy 184 from the RADIUS device 170. Referring to the example embodiment of FIG. 1, the EzVPN server device 160 receives the QoS policy 184 from the RADIUS device 170 by way of VSA 38.

FIG. 4 is a flow chart of processing steps that shows a particular embodiment of the high-level processing operations performed by the QoS manager process 150-2 when it obtains connection speed data from the network communications device in accordance with one example configuration.

In step 220, the QoS manager process 150-2 polls the network communications device 153 (e.g., DSL modem, cable modem, etc.) at the start of the communications session 165 to determine the connection speed data associated with the network communications device 153. Generally, upon the powering up of the DSL or cable modems, the EzVPN client device 152 becomes aware of the uplink speed (kbps) using the DSL and/or Data Over Cable Service Interface Specification (DOCSIS) parameters.

In step 221, the QoS manager process 150-2 dynamically polls the network communications device 153 (e.g., DSL modem, cable modem, etc.) during the communications session 165 to determine a change in connection speed data associated with the network communications device 153. As such, the EzVPN client device 152 is capable of updating the EzVPN server device 160 during the communications session 165 (e.g., via the RADIUS attribute 77, CONNECT_INFO data packet 181) without impacting the cryptography session of the EzVPN environment 190. Accordingly, the EzVPN server device 160 is capable of dynamically obtaining and then subsequently applying a new QoS policy to the communications session 165 with the EzVPN client 152 (or additional EzVPN client devices such as second EzVPN client device 157).

In step 222, the Q0S manager process 150-2 obtains connection speed data associated with a download speed (e.g., receive or downstream rate) for transferring data from the EzVPN server device 160 to the EzVPN client device 152.

In step 223, the QoS manager process 150-2 obtains connection speed data associated with an upload speed (e.g., transfer or upstream rate) for transferring data from the EzVPN client device 152 to the EzVPN server device 160.

In step 224, the QoS manager process 150-2 obtains connection speed data from a Digital Subscriber Line (DSL) modem device (e.g., the network communications device 153), wherein the DSL modem device enables communications between the EzVPN client device 152 and the EzVPN server device 160.

In step 225, the QoS manager process 150-2 obtains connection speed data from a cable modem device (e.g., the network communications device 153), wherein the cable modem device enables communications between the EzVPN client device 152 and the EzVPN server device 160.

Figure 5:
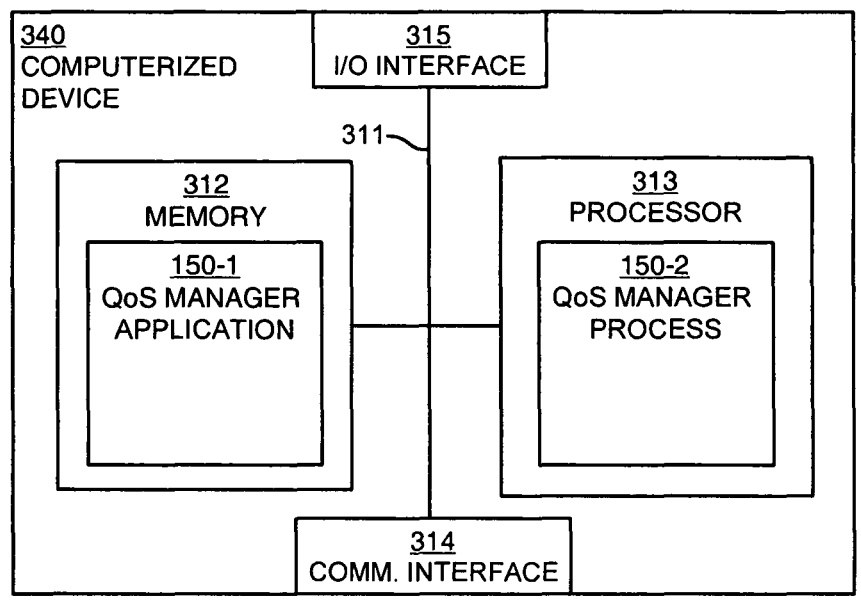
FIG. 5 is a block diagram of a computerized system configured with an application including a QoS manager process in accordance with one example configuration

FIG. 5 illustrates example architectures of a computer device that is configured as a computer system 340. The computerized device 340 may be a type of computerized system such as a personal computer, workstation, portable computing device, mainframe, server or the like. In this example, the system includes an interconnection mechanism 311 that couples a memory system 312, a processor 313, a communications interface 314, and an I/O interface 315. The communications interface 314 and I/O interface 315 allow the computer system 340 to communicate with external devices or systems.

The memory system 312 may be a type of computer readable medium that is encoded with a QoS manager application 150-1 that represents software code such as data and/or logic instructions (e.g., stored in the memory or on another computer readable medium such as a disk) that embody the processing functionality of embodiments of the invention for the QoS manager 150 as explained above. The processor 313 can access the memory system 312 via the interconnection mechanism 311 in order to launch, run, execute, interpret or otherwise perform the logic instructions of the applications 150-1 for the host in order to produce a corresponding QoS manager process 150-2. In other words, the QoS manager process 150-2 represents one or more portions of the QoS manager application 150-1 performing within or upon the processor 313 in the computer system.

It is noted that example configurations disclosed herein include the QoS manager application 150-1 itself (i.e., in the form of un-executed or non-performing logic instructions and/or data). The QoS manager application 150-1 may be stored on a computer readable medium (such as a floppy disk), hard disk, electronic, magnetic, optical or other computer readable medium. The QoS manager application 150-1 may also be stored in a memory system 312 such as in firmware, read only memory (ROM), or, as in this example, as executable code in, for example, Random Access Memory (RAM). In addition to these embodiments, it should also be noted that other embodiments herein include the execution of the QoS manager application 150-1 in the processor 313 as the QoS manager process 150-2. In another alternative configuration, the QoS manager process 150-2 may be embedded in the operating system or may operate as a separate process from the application and may track all user input or only some user input (such as mouse movement or clicks, but not keyboard input). Those skilled in the art will understand that the computer system 340 may include other processes and/or software and hardware components, such as an operating system not shown in this example.

While this invention has been particularly shown and described with references to preferred embodiments thereof, it will be understood by those skilled in the art that various changes in form and details may be made therein without departing from the spirit and scope of the present application as defined by the appended claims. Such variations are covered by the scope of this present disclosure. As such, the foregoing description of embodiments of the present application is not intended to be limiting. Rather, any limitations to the invention are presented in the following claims. Note that the different embodiments disclosed herein can be combined or utilized individually with respect to each other.

What we claim is:

1. A method, comprising:
    receiving, from an Easy Virtual Private Network (EzVPN) client device, a measured speed at which the EzVPN client device can send data;
    determining, at an Easy Virtual Private Network (EzVPN) server device, a Quality of Service (QoS) policy for a communications session between both the EzVPN client device and the EzVPN server device based, at least in part, the measured speed at which the EzVPN client device can send data; and
    wherein the QoS policy specifies how session traffic is queued at the client device for transmission to the server device and also how session traffic is queued at the server device for transmission to the client device;
    applying, at the EzVPN server device, the QoS policy to the communications session between the EzVPN client device and the EzVPN server device;
    transmitting, from the EzVPN server device, the QoS policy to the EzVPN client device;
    polling the EzVPN client device during the communication session to update the measured speed, and updating the QoS policy during the communication session based on the updated measured speed.

2. The method of claim 1, wherein determining a QoS policy comprises at least one of:
    obtaining a QoS policy from a local database, wherein the local database determines an appropriate QoS policy for the measured speed; or
    obtaining a QoS policy from a remote source.

3. The method of claim 1, wherein determining a QoS policy comprises obtaining a QoS policy from a remote source at least in part by:
    transmitting, from the EzVPN server device, the measured speed to a Remote Authentication Dial In User Server (RADIUS) device; and
    receiving, at the EzVPN server device, the QoS policy from the RADIUS device.

4. The method of claim 1, comprising applying the QoS policy to a communications session between the EzVPN server device and at least one additional EzVPN client device.

5. The method of claim 1, wherein determining the QoS policy comprises retrieving, based on the measured speed, the QoS policy from a database containing a mapping of a plurality of measured speeds to a plurality of QoS policies.

6. The method of claim 1, wherein the measured speed comprises a transmit upstream connect speed from the EzVPN client device to the EzVPN server device, wherein determining the Quality of Service (QoS) policy for the communications session is also based, at least in part, on a receive downstream connect speed from the EzVPN server device to the EzVPN client device.

7. The method of claim 1, wherein the EzVPN server device receives the measured speed from the EzVPN client device in an Internet Security Association and Key Management Protocol (ISAKMP) notification payload.

8. The method of claim 1, wherein the QoS policy comprises one or more of, a shaping parameter, a queuing parameter, a policing parameter, and a bandwidth parameter.

9. An apparatus, comprising:
    one or more processors;
    a memory system encoded with
    instructions configured to receiving, from an Easy Virtual Private Network (EzVPN) client device, a measured speed at which the EzVPN client device can send data;
    Quality of Service (QoS) logic instructions configured to determine a QoS policy for a communication session between both an Easy Virtual Private Network ("EzVPN") server device and the EzVPN client device based, at least in part, on a measured speed at which the EzVPN client device can send data; and
    wherein the QoS policy specifies how session traffic is queued at the EzVPN client device for transmission to the EzVPN server device and also how session traffic is queued at the EzVPN server device for transmission to the EzVPN client device;

management logic instructions configured to enforce the QoS policy on the communication session while maintaining an EzVPN between the EzVPN server device and the EzVPN client device;

instructions configured to transmit, from the EzVPN server device, the QoS policy to the EzVPN client device;

wherein the management logic instructions are configured to poll the EzVPN client device during the communication session to update the measured speed and the QoS logic instructions are configured to update the QoS policy during the communication session based on the updated measured speed.

10. The apparatus of claim 9, wherein the measured speed comprises a transmit upstream connect speed from the EzVPN client device to the EzVPN server device, wherein determining the Quality of Service (QoS) policy for the communications session is also based, at least in part, on a receive downstream connect speed from the EzVPN server device to the EzVPN client device.

11. The apparatus of claim 9, wherein the EzVPN server device receives the measured speed from the EzVPN client device in an Internet Security Association and Key Management Protocol (ISAKMP) notification payload.

12. The apparatus of claim 9, wherein the QoS policy comprises one or more of, a shaping parameter, a queuing parameter, a policing parameter, and a bandwidth parameter.

13. The apparatus of claim 9, wherein enforcing the QoS Policy comprises applying the QoS policy to packets of the communication session to achieve a desired QoS.

14. The apparatus of claim 9, wherein the communications session is a multimedia communication session.

15. The apparatus of claim 9, wherein the QoS logic instructions are configured to query a RADIUS server to determine the QoS policy for the communication session.

16. The apparatus of claim 9, wherein the management logic instructions are configured to use a default QoS policy if the QoS logic cannot determine a QoS policy for the communication session.

17. The apparatus of claim 9, wherein the QoS logic instructions are configured to obtain a QoS policy from a local database.

18. The apparatus of claim 9, the apparatus being positioned in the EzVPN server device.

19. The apparatus of claim 18, wherein the EzVPN server device is one of a router, a switch, and a hub.

20. The apparatus of claim 9, wherein the QoS policy is determined by retrieving, based on the measured speed, the QoS policy from a database containing a mapping of a plurality of measured speeds to a plurality of QoS policies.

21. A computer-readable disk storing one or more sequences of instructions that, when executed by one or more processors, cause the one or more processors to perform:

receiving, from an Easy Virtual Private Network (EzVPN) client device, a measured speed at which the EzVPN client device can send data;

determining, at an Easy Virtual Private Network (EzVPN) server device, a Quality of Service (QoS) policy for a communications session between both the EzVPN client device and the EzVPN server device based, at least in part, on a measured speed at which the EzVPN client device can send data; and wherein the QoS policy specifies how session traffic is queued at the client device for transmission to the server device and also how session traffic is queued at the server device for transmission to the client device;

applying, at the EzVPN server device, the QoS policy to the communications session between the EzVPN client device and the EzVPN server device;

transmitting, from the EzVPN server device, the QoS policy to the EzVPN client device;

polling the EzVPN client device during the communication session to update the measured speed, and updating the QoS policy during the communication session based on the updated measured speed.

22. The computer-readable disk of claim 21, wherein determining a QoS policy comprises at least one of:

obtaining a QoS policy from a local database, wherein the local database determines an appropriate QoS policy for the measured speed; and obtaining a QoS policy from a remote source.

23. The computer-readable disk of claim 22, wherein obtaining a QoS policy from a remote source comprises:

transmitting, from the EzVPN server device, the measured speed to a Remote Authentication Dial In User Server (RADIUS) device; and receiving, at the EzVPN server device, the QoS policy from the RADIUS device.

24. The computer-readable disk of claim 21, wherein the instructions comprise instructions that cause applying the QoS policy to a communications session between the EzVPN server device and at least one additional EzVPN client device.

25. The computer-readable disk of claim 21, wherein determining the QoS policy comprises retrieving, based on the measured speed, the QoS policy from a database containing a mapping of a plurality of measured speeds to a plurality of QoS policies.

26. The computer-readable disk of claim 21, wherein the measured speed comprises a transmit upstream connect speed from the EzVPN client device to the EzVPN server device, wherein determining the Quality of Service (QoS) policy for the communications session is also based, at least in part, on a receive downstream connect speed from the EzVPN server device to the EzVPN client device.

27. The computer-readable disk of claim 21, wherein the EzVPN server device receives the measured speed from the EzVPN client device in an Internet Security Association and Key Management Protocol (ISAKMP) notification payload.

28. The computer-readable disk of claim 21, wherein the QoS policy comprises one or more of, a shaping parameter, a queuing parameter, a policing parameter, and a bandwidth parameter.

* * * * *